July 30, 1940.  R. A. GOEPFRICH ET AL  2,209,772

BRAKE

Filed Oct. 27, 1938  2 Sheets-Sheet 1

INVENTOR.
RUDOLPH A. GOEPFRICH
BY  CARL PRESS
M. W. McConkey
ATTORNEY.

July 30, 1940.  R. A. GOEPFRICH ET AL  2,209,772
BRAKE
Filed Oct. 27, 1938  2 Sheets-Sheet 2
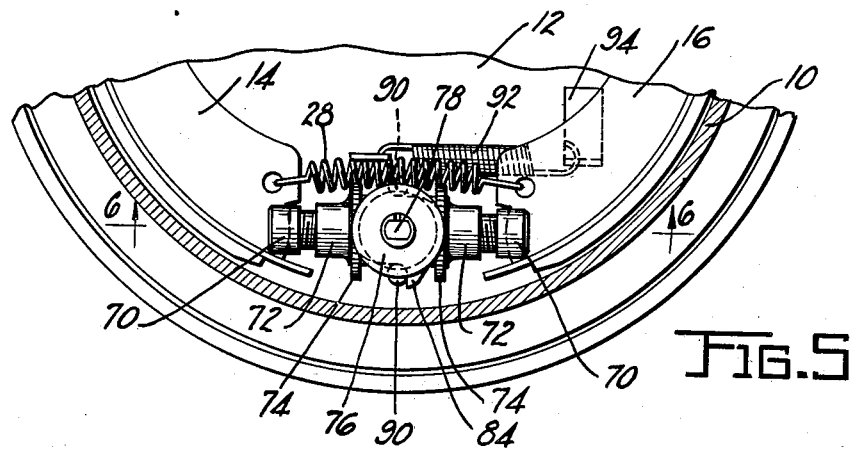
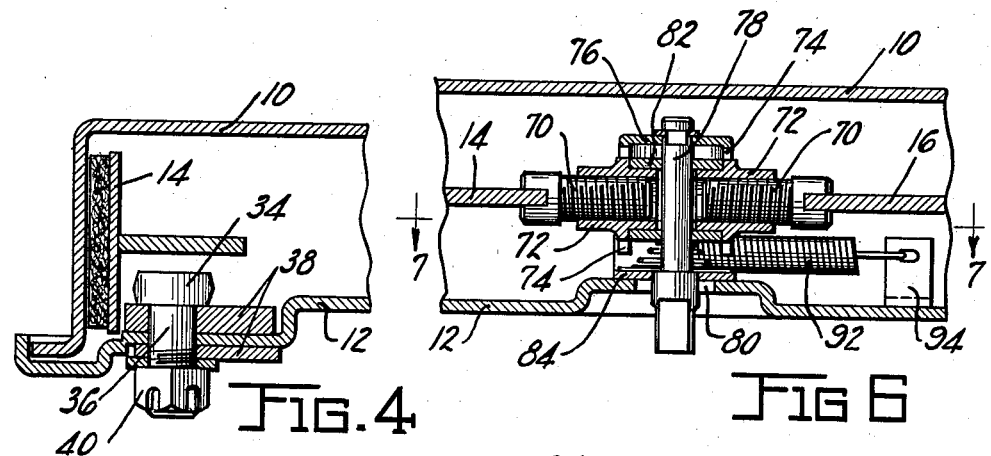
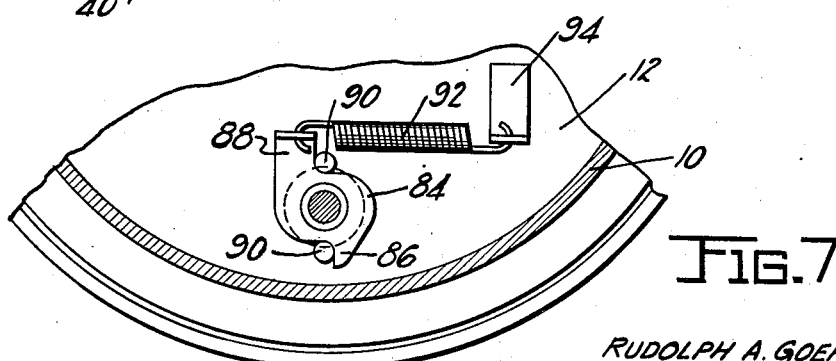
INVENTOR.
RUDOLPH A. GOEPFRICH
CARL PRESS
BY
ATTORNEY.

Patented July 30, 1940

2,209,772

UNITED STATES PATENT OFFICE 2,209,772

BRAKE

Rudolph A. Goepfrich, South Bend, Ind., and Carl Press, Frankfort-on-the-Main, Germany, assignors to Bendix Aviation Corporation, South Bend, Ind., a corporation of Delaware Application October 27, 1938, Serial No. 237,212

7 Claims. (Cl. 188—78)

This invention relates to brakes, and is illustrated as embodied in an internal expanding brake for an automobile wheel.

An object of the invention is to provide anchorage means permitting the ends of the shoes or the equivalent to shift radially toward and from the drum in applying the brake, in a compact combination with means acting on the same ends of the shoes to apply the brake. Preferably one or both of the shoe ends is mounted on a pivoted anchorage arm which is actuated in applying the brake, by an operating lever or the like, to swing its shoe against the drum. Where a lever is used as the operating means, it may be connected to the other shoe by a thrust link or the like to act simultaneously on both shoes. This arrangement is especially advantageous where a hydraulic actuator also acts on the same ends of the shoes.

The above and other objects and features of the invention, including various novel combinations and desirable arrangements, will be apparent from the following description of the illustrative embodiment shown in the accompanying drawings, in which:

Figure 1 is a vertical section through one of the brakes, in a plane just inside the head of the brake drum, and showing the brake shoes in side elevation;

Figures 2, 3 and 4 are partial sections on the lines 2—2, 3—3, and 4—4 of Figure 1;

Figure 5 is a partial section corresponding to the bottom portion of Figure 1, but showing a modified construction;

Figure 6 is a partial section on the line 6—6 of Figure 5; and

Figure 7 is a partial section on the line 7—7 of Figure 6.

The brake illustrated in Figures 1–4 includes a rotatable drum 10, at the open side of which is a support such as a backing plate 12. The friction means of the brake may comprise shoes 14 and 16, faced with the usual brake lining, and provided with suitable positioning means such as steady rests 18.

Figure 1:
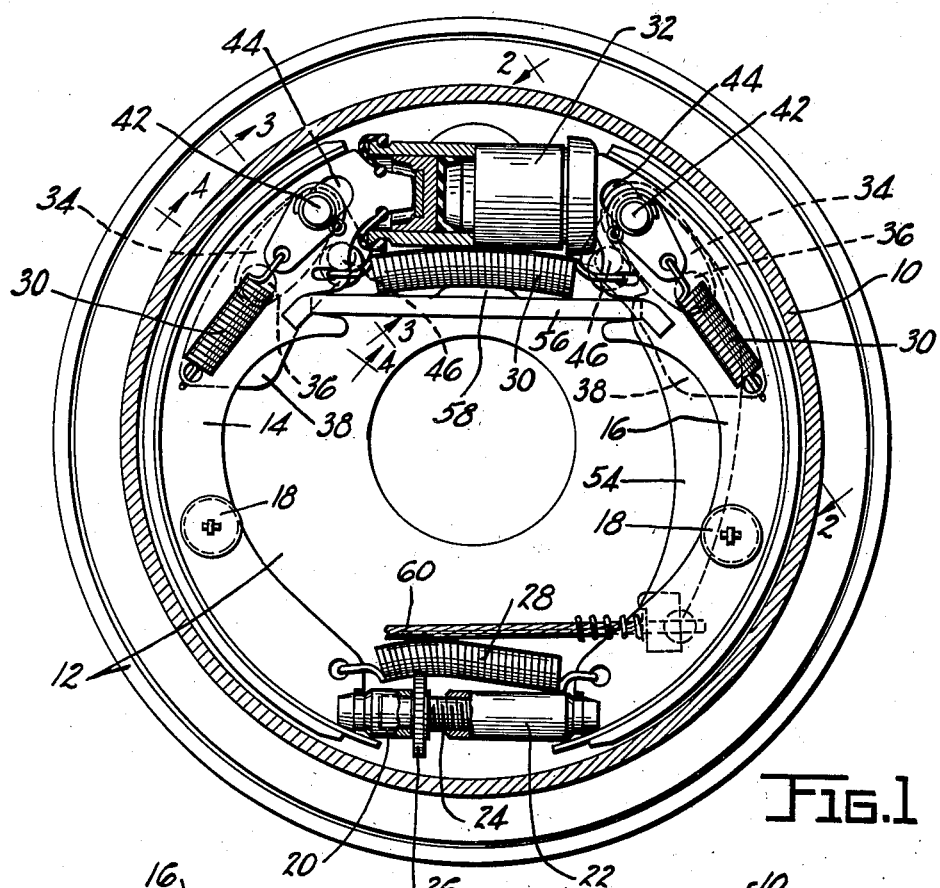
Figures 2, 3:
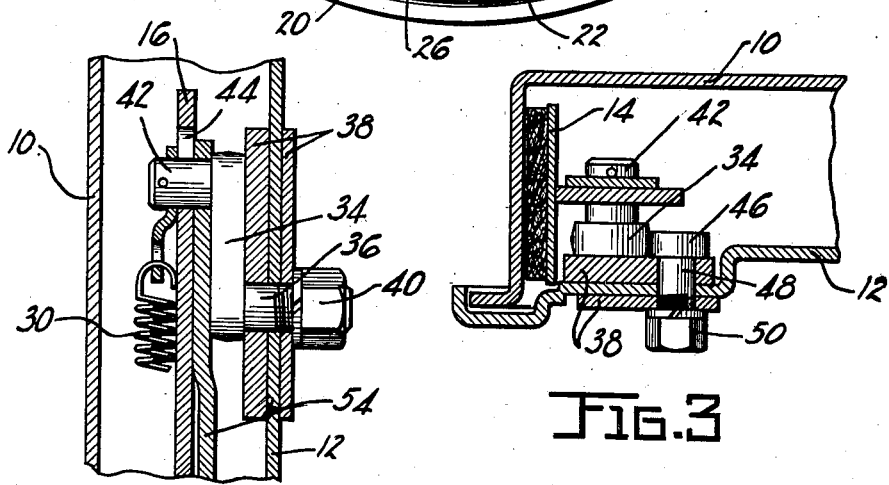

The shoes are shown connected into a unit friction device by means shown in Figure 1 as including an unthreaded socket 20 slotted to engage the notched end of the web of shoe 14, and a threaded socket 22 slotted to embrace the notched end of the web of shoe 16, these sockets being mounted respectively on unthreaded and threaded end portions of an adjusting member 24 provided with a serrated flange 26 accessible through an opening in the backing plate. A spring 28 tensioned between the shoes holds these parts together, and also yieldingly interlocks with flange 26.

The shoes are applied, against the resistance of return springs 30, by a hydraulic actuator 32 of the cylinder and piston type, arranged between the upper ends of the shoes, as well as by an auxiliary mechanical actuator described below.

The anchorage of the shoes consists of anchor arms 34 each having on one side a pivot 36 mounted on the backing plate 12 and reinforcing plates 38 and held by a nut 40, and each having on its other side at its opposite end a pivot 42 extending through an elongated opening 44 in and adjacent the upper end of the shoe web. An adjustable eccentric 46, carried by a stem 48 mounted in the backing plate and held by a nut 50, engages the inner edge of each arm 34 when the brake is released, to determine its released position.

As an auxiliary mechanical actuator, for operation by the emergency or parking brake lever, and used especially on rear brakes, we provide means such as a lever 54, pivoted at its upper end on the pivot 42 of the shoe 16 and swinging beside and in a plane paralleling the backing plate, and which acts on the shoe 14 through a thrust connection such as a link 56 slotted at its ends to embrace notched portions of the web of shoe 14 and of the lever 16. The link 56 is shown with a rib 58 against which one of the springs 30 is tensioned, to obviate rattling. The lever 54 is operated by means such as a cable 60, arranged to extend through the backing plate and forms part of the usual cable-and-conduit Bowden-type control (not shown).

In operation, tension on the cable 60 rocks the lever 54 to cause a balanced spreading action on the link 56 and on the pivot 42 of the anchorage arm 34 of the shoe 16.

In the modification of Figures 5–7 stems 70, slotted at their ends to embrace the notched ends of the shoe webs, are threaded into sockets 72 formed with operating gears 74 meshing with a crown gear 76 on a shaft 78. The shaft 78 extends between the ends of stems 70 and out through an opening 80 in the backing plate, its end being flattened to be gripped by a wrench. A spacer sleeve 82 is mounted on the shaft 78 between the sockets 72.

A centralizer plate 84 with projections 86 and 88 is urged against stop pins 90 carried by the backing plate, by means such as a spring 92 tensioned between the projection 88 and a bracket 94 secured to the backing plate. The centralizer plate 84 may also act as a cover plate for the opening 80 in the backing plate.

A spring 96 is compressed between spacer sleeve 82 and the centralizer plate 84.

The above described parts, in the operation of the brake, form a centering device to position the brake shoes when the brake is released. When the brake is applied, the shoes move in one direction or the other, causing centralizer plate 84 to fulcrum on one or the other of the stop pins 90, against the resistance of the spring 92. When the brake is released, the spring 92 returns the projections 86 and 88 into engagement with the pins 90, thereby centering the shoes.

While particular constructions have been described in detail, it is not our intention to limit the scope of the invention to those constructions, or otherwise than by the terms of the appended claims.

We claim:

1. A brake comprising a drum, a backing plate adjacent the drum, a friction device within the drum having ends separable to apply the brake, anchorage arms beside the friction device and having pivots connecting them to the ends thereof and which are pivotally connected to the backing plate, a lever mounted on one of said pivots and having a thrust connection with the friction device across the drum, and means for rocking said lever to apply the brake.

2. A brake comprising a drum, a backing plate adjacent the drum, a friction device within the drum having ends separable to apply the brake, anchorage means for the friction device including an arm beside the friction device and having a pivot connecting it to the end thereof and which is pivotally connected to the backing plate, a lever mounted on said pivot and having a thrust connection with the friction device across the drum, and means for rocking said lever to apply the brake.

3. A brake comprising a drum, a backing plate adjacent the drum, a friction device within the drum having ends separable to apply the brake, anchorage arms beside the friction device and having pivots connecting them to the ends thereof and which are pivotally connected to the backing plate, a lever mounted on one of said pivots and having a thrust connection with the friction device across the drum, and means for rocking said lever to apply the brake, together with adjustable stops engaged by said arms when the brake is released and determining the released positions of the ends of the friction device.

4. A brake comprising a drum, a backing plate adjacent the drum, a friction device within the drum having ends separable to apply the brake, anchorage means for the friction device including an arm beside the friction device and having a pivot connecting it to the end thereof and which is pivotally connected to the backing plate, a lever mounted on said pivot and having a thrust connection with the friction device across the drum, and means for rocking said lever to apply the brake, together with an adjustable stop engaged by said arm when the brake is released and determining the released position of one end of the friction device.

5. A brake comprising a drum, a backing plate adjacent the drum, a friction device within the drum having ends separable to apply the brake, anchorage arms beside the friction device and having pivots connecting them to the ends thereof and which are pivotally connected to the backing plate, a lever mounted on one of said pivots and having a thrust connection with the friction device across the drum, and means for rocking said lever to apply the brake, said friction device having elongated openings adjacent its ends receiving said pivots and permitting the friction device to anchor on one or the other of the pivots according to the direction of drum rotation.

6. A brake comprising a drum, a backing plate adjacent the drum, a friction device within the drum having ends separable to apply the brake, anchorage arms beside the friction device and having pivots connecting them to the ends thereof and which are pivotally connected to the backing plate, a lever mounted on one of said pivots and having a thrust connection with the friction device across the drum, and means for rocking said lever to apply the brake, together with adjustable stops engaged by said arms when the brake is released and determining the released positions of the ends of the friction device, said friction device having elongated openings adjacent its ends receiving said pivots and permitting the friction device to anchor on one or the other of the pivots according to the direction of drum rotation.

7. A brake comprising a drum, a backing plate adjacent the drum, a friction device within the drum having ends separable to apply the brake, anchorage arms beside the friction device and having pivots connecting them to the ends thereof and which are pivotally connected to the backing plate, a lever mounted on one of said pivots and having a thrust connection with the friction device across the drum, and means for rocking said lever to apply the brake, together with yielding centering means acting on the friction device.

RUDOLPH A. GOEPFRICH.
CARL PRESS.